(12) United States Patent  
Buchwald et al.

(10) Patent No.: US 8,413,927 B2  
(45) Date of Patent: Apr. 9, 2013

(54) LANDING GEAR FOR SPACECRAFT

(75) Inventors: Robert Buchwald, Stuhr (DE); Erich Werth, Stuhr (DE)

(73) Assignee: Astrium GmbH, Taufkirchen (DE)

( * ) Notice: Subject to any disclaimer, the term of this patent is extended or adjusted under 35 U.S.C. 154(b) by 230 days.

(21) Appl. No.: 12/983,360

(22) Filed: Jan. 3, 2011

(65) Prior Publication Data

US 2011/0163201 A1    Jul. 7, 2011

(30) Foreign Application Priority Data

Jan. 4, 2010  (DE) .......................... 10 2010 004 571

(51) Int. Cl.
*B64C 25/32* (2006.01)
*B64C 25/00* (2006.01)

(52) U.S. Cl. .............. 244/100 R; 244/158.1; 244/138 R

(58) Field of Classification Search .............. 244/100 R, 244/108, 158.1
See application file for complete search history.

(56) References Cited

U.S. PATENT DOCUMENTS

| | | | |
|---|---|---|---|
| 3,164,222 A * | 1/1965 | Conrad ..................... | 244/138 R |
| 3,175,789 A * | 3/1965 | Blumrich .................. | 244/100 R |
| 4,457,170 A * | 7/1984 | Thrift et al. ............... | 244/135 R |
| 4,558,837 A * | 12/1985 | Mens et al. .................... | 244/108 |
| 5,648,758 A * | 7/1997 | Tweadey et al. ............. | 340/550 |
| 6,227,494 B1 | 5/2001 | Turner | |
| 6,318,669 B1 * | 11/2001 | Dazet et al. ............... | 244/100 R |
| 7,408,474 B2 * | 8/2008 | Frazier et al. ................. | 340/635 |
| 7,854,179 B2 * | 12/2010 | Shimizu ...................... | 74/473.1 |

* cited by examiner

*Primary Examiner* — Rob Swiatek
*Assistant Examiner* — Marc Burgess
(74) *Attorney, Agent, or Firm* — W. F. Fasse

(57) ABSTRACT

A pivotal connection and a substantially rigid yet disruptable mechanical connection mount a respective foot pad on a distal end of each one of plural landing legs of a lander spacecraft. The mechanical connection includes at least one predetermined rated breaking point designed to break when the foot pad makes contact with a landing ground surface. At least two sensor elements, preferably electrical conductors or switches, are incorporated in the mechanical connection(s) of one or more foot pads. When the foot pad makes ground contact, the mechanical connection breaks at the rated breaking point(s), which also disrupts or actuates the sensor element(s), which thus provides a signal to an evaluating unit, which triggers the shut-down of at least one braking retrorocket or retrothruster.

7 Claims, 2 Drawing Sheets

US 8,413,927 B2

LANDING GEAR FOR SPACECRAFT

PRIORITY CLAIM

This application is based on and claims the priority under 35 USC 119 of German Patent Application 10 2010 004 571.3, filed on Jan. 4, 2010, the entire disclosure of which is incorporated herein by reference.

FIELD OF THE INVENTION

The invention relates to a landing gear arrangement for spacecraft equipped with landing legs and landing feet that each include a landing foot pad movably connected to the distal free end of a respective landing leg.

BACKGROUND INFORMATION

For landing on heavenly bodies such as a planet or the moon, landing spacecraft (e.g. a so-called lander or landing module) are conventionally equipped with landing gear including plural landing legs and a respective landing foot pad mounted on the free distal end of each landing leg. For example, three landing legs may each have a respective landing foot pad either rigidly or pivotally mounted on the free distal end of the respective landing leg. For reducing the shock loads that arise during touchdown and landing of the spacecraft, and particularly when the foot pads of the landing feet contact and settle onto the landing ground surface of the heavenly body, the landing legs of the spacecraft can be equipped with shock absorbers, or also with so-called crush elements or crumple zones made of aluminum honeycomb, for example. Also, in order to prevent the foot pads from sinking too deeply into the landing ground surface of the heavenly body, which is often very soft or loose ground, the foot pads are designed with a sufficiently large surface area so as to distribute the landing contact forces over this enlarged surface area of the foot pads. Moreover, while a rigid connection of the foot pads to the distal ends of the landing legs may be mechanically simpler, a pivotal connection of each foot pad onto the respective landing leg allows each foot pad to adapt its position better to the respective local contour of the landing ground surface at the location at which the respective foot pad touches down. For example, the US Apollo Lunar Module included a landing gear of the abovementioned general type with a pivotal mounting or connection of the landing feet on the landing legs.

Furthermore, because the pivotally mounted landing foot can adapt to the contour of the landing ground surface without hindrance in this manner, it also helps to prevent the application of excessive bending moments onto the landing legs and especially the shock absorbers thereof. Namely, a rigidly mounted landing foot would tend to exert a bending moment on the landing leg when the landing foot is urged to adapt its orientation to the contour of the landing ground surface during the touchdown and landing process. That is avoided by the pivotal connection of each landing foot on the respective landing leg. However, in this case, the pivotal connection must be locked or blocked to prevent pivoting during the launch and flight of the spacecraft, e.g. on its transport rocket, and also during the extension or deployment of the landing gear until a time shortly before the landing of the spacecraft on the heavenly body, in order to prevent the foot pads from having an uncontrolled or random starting position at the beginning of the landing process. Such locking or blocking of the pivotal connection between the landing foot (e.g. particularly the foot pad) and the landing leg can be achieved by an additional mechanical connection that is designed to withstand the loads arising during the launch from earth, during the spaceflight, and during the approaching flight to the target destination landing site on a heavenly body, without disruption of or damage to the mechanical connection. Furthermore, however, the mechanical connection must be designed so that it will be overcome or disrupted or broken as a result of the higher forces that will necessarily arise at the moment when the foot pad touches down and contacts on the landing ground surface of the heavenly body.

U.S. Pat. No. 6,227,494 (Turner) discloses a landing gear arrangement for spacecraft, comprising landing legs and landing feet with foot pads pivotally or articulately connected to the distal free ends of the landing legs oriented away from the spacecraft body. Furthermore, in the disclosed arrangement, mechanical connections are additionally provided only for the structure. The landing leg may include a honeycomb crushable portion for absorbing landing forces, and a sensor assembly may be provided within the spherical bearing assembly of the pivotal connection joint for providing a touch-down signal. The sensor assembly has a complicated construction with many components to be incorporated in the connection joint assembly. There is no redundancy and no interaction or cooperation between a mechanical triggering and an electrical triggering at the time of ground contact, and there is also no provision for thereby releasing a fixing or blocking of the foot pad.

When a spacecraft is to land on a heavenly body having only a thin atmosphere or no atmosphere, such as the earth's moon for example, it is further known to reduce or minimize the forces that arise during the landing by slowing-down or braking the motion of the spacecraft until shortly before its touchdown on the landing ground surface. Such a braking process is usually carried out by appropriate firing of separate braking engines, e.g. so-called retrorockets or retrothrusters. Sensors are provided to control the firing of the retrorockets or retrothrusters based on the distance from the landing ground surface. For example the spacecraft may be equipped with an electromechanical surface sensor or with a contactless distance measuring sensor, for example using a radar system, to generate a signal that causes the retrorockets to be switched off, so that the spacecraft completes its landing and settles down onto the landing ground surface. The terms braking engine, retrorocket and retrothruster are each used generally and exchangeably herein, to cover both rockets and thrusters and all other means of producing a braking thrust for slowing, reversing or maneuvering the motion of a spacecraft.

SUMMARY OF THE INVENTION

In view of the above, it is an object of the invention to provide a landing gear arrangement for spacecraft of the abovementioned general type, which is improved to combine the functions of fixing or blocking the orientation of a foot pad relative to the landing leg during flight of the spacecraft, releasing the foot pad to be movable relative to the landing leg upon touching down on the landing ground surface of a heavenly body, and identifying the moment of ground contact during landing. Furthermore, it is an object of the invention to achieve such a combination of functions in a landing gear arrangement that is simple in construction, has a reduced or minimum number of components, is weight-saving, and provides redundancy of components for the above functions. The invention further aims to avoid or overcome the disadvantages of the prior art, and to achieve additional advantages, as apparent from the present specification. The attainment of these objects is, however, not a required limitation of the claimed invention.

The above objects have been achieved according to the invention in a landing gear arrangement for a spacecraft having landing legs, as follows. The landing gear arrangement includes a respective landing foot with a foot pad that is movably connected to a distal free end of each respective landing leg, namely the end of the landing leg oriented away from the spacecraft body. Not every landing leg of the spacecraft needs to be equipped with the inventive arrangement, but preferably a plurality of legs are so equipped. In addition to the movable connection, which is especially a pivotal connection and preferably a spherical bearing joint, the landing gear arrangement further includes a mechanical connection between each pertinent landing leg and its associated landing foot pad. This mechanical connection incorporates at least one predetermined rated breaking point that has a lower load-bearing strength than the remainder of this mechanical connection, and at least one and preferably at least two sensor elements integrated in the mechanical connection(s). The sensor elements are preferably electrical sensor elements, and most preferably are electrical current carrying wires or conductors, or electrical switches. Each sensor element is arranged on or preferably in a strut, rod or pipe of the mechanical connection. Most preferably, the mechanical connection includes six struts in the form of hollow rods or pipes or tubes that are arranged in a hexapod truss configuration connecting three points on the landing foot pad with three rotationally offset points on the landing leg.

With the above inventive arrangement, the mechanical connection (and particularly the hexapod struts between the landing foot pad and the landing leg) as well as the sensor element(s) incorporated in the strut(s), provide the combined functions of a breakable and thereby releasable rigid connection between the landing foot pad and the landing leg, and the electrically signaled moment of contact between the respective foot pad and the landing ground surface of the heavenly body. Namely, the landing foot pad is initially rigidly oriented relative to the landing leg by the intact mechanical connection, but when the foot pad makes contact with the landing ground surface at an angle, the arising high mechanical loads on the struts of the mechanical connection cause the predetermined rated breaking points of one or more struts to break, which allows the foot pad to tilt or pivot relative to the landing leg via the pivotal connection which comprises a pivotal joint or especially a spherical bearing joint. Also, when the struts of the mechanical connection break at the rated breaking points, this also breaks the electrical wire or trips the electrical switch incorporated in the respective strut, which thereby interrupts or completes a current carrying circuit path, and this provides a corresponding trigger signal to an evaluating unit. When the evaluating unit receives such a signal from one or more of these sensor elements, and preferably at least two of these sensors, as a result thereof the evaluating unit produces or releases a control signal that serves for switching off one or more of the braking engines, e.g. retrorockets or retrothrusters.

Thus, the inventive landing gear arrangement achieves the combined functions of rigidly fixing the position of the foot pad during the flight and landing approach of the spacecraft, releasing the foot pad to allow it to be pivotal when it touches down on the landing ground surface, identifying and signaling the moment of ground contact, and shutting down one or more braking engines in response to the signaled moment of ground contact. Moreover, this is achieved according to the invention by means of a simple, very lightweight, and multiply redundant arrangement that simultaneously reduces the mass as well as the complexity of the overall landing system.

BRIEF DESCRIPTION OF THE DRAWINGS

In order that the invention may be clearly understood, it will now be described by way of example with reference to the accompanying drawings, wherein.

Figure 1:
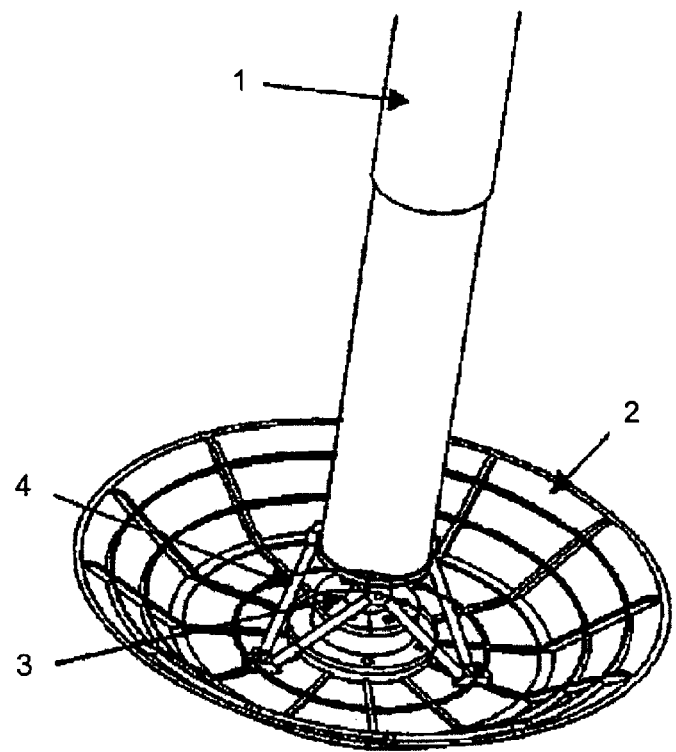
FIG. 1 is a perspective view of the lower or distal free end of a landing leg of a lander spacecraft, with a landing foot connected to the end of the landing leg.

DETAILED DESCRIPTION OF PREFERRED EXAMPLE EMBODIMENTS AND THE BEST MODE OF THE INVENTION

Throughout the drawing figures, the same or corresponding components are labeled with the same reference numbers.

A landing gear arrangement for a spacecraft preferably includes at least three landing legs 1, although FIG. 1 shows only the lower or distal end of only a single one of such landing legs 1. Each landing leg 1 can have any conventionally known construction, for example including a main leg as well as support struts or braces that further support or strengthen the main leg. FIG. 1 merely schematically shows a single main leg for simplicity, whereby this leg may be telescoping, may incorporate a shock absorber, may incorporate crumple zones, or may include any other known features. Of special significance to the present invention is the landing foot including a landing foot plate or foot pad 2, as well as its connection to the lower or distal end of the landing leg 1, i.e. the end oriented away from the spacecraft body. In this regard, the foot pad 2 is movably and particularly pivotally connected to the landing leg 1 by a spherical bearing 3 that forms a pivotal connection. Additionally, the foot pad 2 is connected to the landing leg 1 by a mechanical connection that is sufficiently rigid to fix the position or orientation of the foot pad 2 relative to the landing leg 1 until this mechanical connection is physically broken or disrupted as described further herein. Preferably, the mechanical connection comprises a plurality of relatively thin or thin-walled yet substantially rigid struts 5, 6, 11, 21 that extend between and interconnect the foot pad 2 and the end of the landing leg 1. These struts are preferably arranged as a hexapod truss mount 4, to provide a lightweight yet rigid fixing of the mechanical position and orientation of the foot pad 2 relative to the landing leg 1. On the other hand, the pivotal connection provided by the spherical bearing 3 allows a pivoting motion of the foot pad 2 relative to the landing leg 1.

Figure 2:
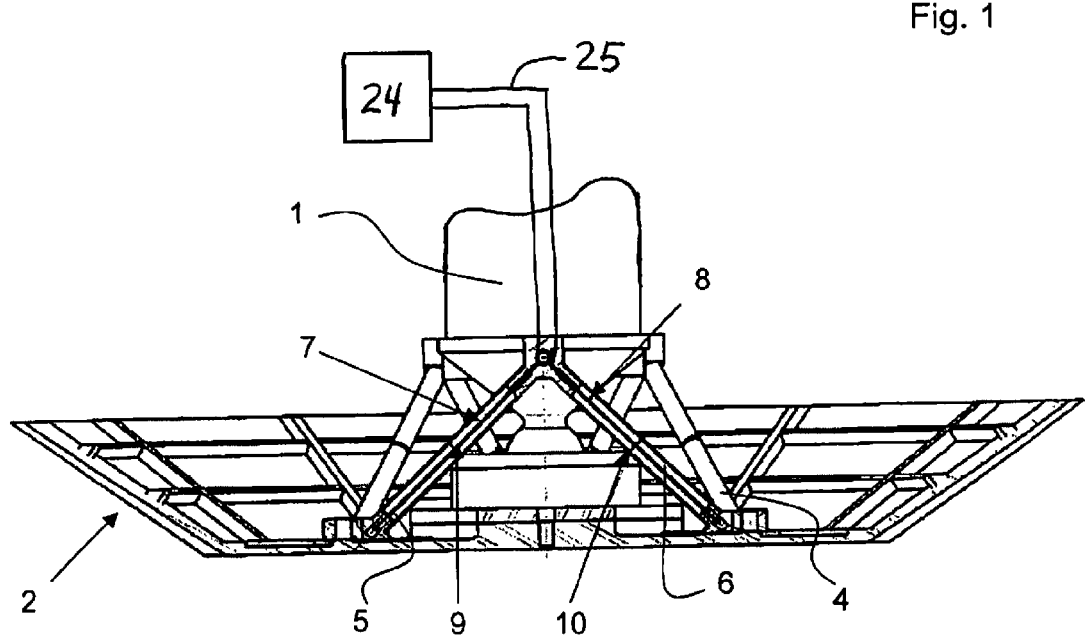
FIG. 2 is a detailed cut-away side view of the landing foot arrangement of FIG. 1 according to a first embodiment of the invention.

In the first embodiment of the inventive landing gear arrangement as shown in FIG. 2, a thin electrical conductor wire 7, 8 is used as a sensor element and signal emitter arranged respectively in at least two of the struts 5, 6 of the hexapod truss mount 4. In this regard, the struts 5, 6 are configured as thin tubes or pipes with a thin cylindrical wall enclosing a hollow interior, and the wires 7, 8 are preferably arranged inside the hollow interiors of these tubes. Thereby, the wires 7 and 8 are protected against environmental influences and accidental disruption due to external abrasion or contact with features of the external environment.

Furthermore, each tubular strut 5, 6 has a predetermined rated breaking point 9, 10 having a reduced structural strength in comparison to the remainder of the tubular strut 5, 6. For example, the predetermined rated breaking point 9, 10 can involve a thinner section of the tube wall, e.g. with a groove encircling the tube, or a set of perforations through the tube wall, or the like. The predetermined rated breaking point 9, 10 is thus the weakest link or weakest point of the substantially rigid mechanical connection between the foot pad 2 and the landing leg 1. The term "substantially rigid" as applying to the struts or the mechanical connection between the foot pad 2 and the landing leg 1 means a rigidity that is greater than that provided by the pivot connection 3, and such a degree of rigidity that is able to withstand the forces arising during launch and flight of the spacecraft and during deployment of the landing gear before contacting the landing ground surface. On the other hand, each predetermined rated breaking point has a reduced rigidity or reduced strength to such a degree that is designed to break under the loads arising when the foot pad 2 makes contact in a non-parallel orientation with a landing ground surface. Also, the breaking of the rated breaking point will dissipate some of the landing shock energy, in a manner similar to the abovementioned crumple zones or crush elements.

Figures 4A, 4B, 4C:
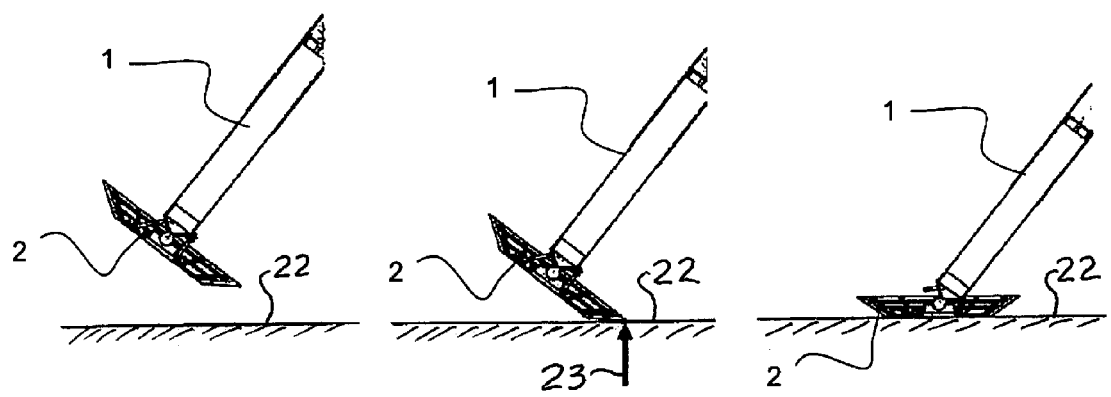
FIGS. 4A, 4B and 4C are schematic side views of three successive stages of the deployment and actuation of the landing foot of the landing gear arrangement according to FIG. 1, during the landing of the spacecraft on a lunar or planetary landing ground surface.

As shown in the successive sequence of FIGS. 4A, 4B and 4C, the spacecraft is approaching a heavenly body, and will touch down with its landing foot pads 2 onto the landing ground surface 22 of the heavenly body, such as the earth's moon, a different planetary moon, or another planet. Before making contact with the landing ground surface 22, the landing foot pad 2 of each landing leg 1 is oriented perpendicularly to the principal axis of the primary leg or strut of the respective landing leg 1. The initial perpendicular orientation is held or fixed by the mechanical connection, and particularly the hexapod truss 4 of struts connecting the foot pad 2 to the landing leg 1. The mechanical connection prevents translational as well as rotational or pivoting motions of the foot pad 2 relative to the landing leg 1. This ensures that the foot pad 2 has a known initial orientation relative to the landing leg 1 when beginning the landing operation as shown in FIG. 4A. This also ensures that the loads arising and to be expected during the approach flight phase are very low, and also that a sufficient bending moment for disrupting the mechanical connection 4 will be applied to the foot pad 2 due to the landing contact forces 23 when the foot pad 2 makes contact with the landing ground surface 22 as shown in FIG. 4B. This will apply even if the landing ground surface 22 is relatively soft or yielding. In this regard, the predetermined rated breaking points 9, 10 are designed to be sufficiently weak, so that the bending moment arising from the landing contact force 23 on the foot pad 2 will mechanically break the rated breaking points 9, 10 and thereby disrupt the mechanical connection and thus the rotational fixing of the foot pad 2 relative to the landing leg 1. Thereafter the foot pad 2 will be free to rotate or pivot about the spherical bearing 3, as the landing leg 1 and the foot pad 2 completely set down on the landing ground surface 22 as shown in FIG. 4C.

Furthermore, when one or more of the thin tubular struts 5, 6 breaks at the rated breaking point 9, 10 during touchdown as shown in FIGS. 4B and 4C, then the electrical conductor wire 7, 8 arranged in the tubular strut 5, 6 will also break. This interrupts the conductivity of the wire 7, 8, and accordingly interrupts the flow of an electrical current through the wire 7, 8. This interruption of an electrical current is provided as a signal via a signal conductor 25 to an evaluating unit 24, which may be arranged on the foot pad 2 or the landing leg 1 or in the spacecraft body. In response to this signal, the evaluating unit 24 generates or releases a control signal that causes a shut-down of at least one braking engine e.g. retrorocket or retrothruster. Preferably, the evaluating unit 24 requires such a contact signal from at least two wires 7, 8 acting as sensor elements and signal emitters, in order to release the braking engine shut-down signal. This provides a degree of safety redundancy. These two signals coming from two signal emitter and sensor element wires 7, 8 can be provided from the same foot pad 2 of the same landing leg 1, or can be provided from the inventive landing gear arrangements on two or more foot pads of two or more landing legs.

In a system with at least three of the sensor element and signal emitter wires 7, 8 per leg of the spacecraft, a sufficient error and fault tolerance is ensured in the sense of a redundant system. Thus, if the inventive system provides at least three sensor element and signal emitter wires 7, 8, which, upon ground contact as described above, produce and provide three ground contact signals to the evaluating unit 24, then no further error or fault checking measures and no further redundancies are needed for the sensing system. Furthermore, the ground contact signals provided by the inventive arrangement on each respective foot pad can be used independently to trigger the shutdown of only one or some of the retrorockets or thrusters. For example, if the spacecraft has a tilted attitude relative to the landing ground surface, so that a single one of the foot pads touches down before other foot pads, then the ground contact signal(s) coming from the foot pad that has already touched down can be used to control the retrorockets or thrusters appropriately to better level the attitude of the spacecraft relative to the landing ground surface for completing the landing process, before completely shutting down all of the retrorockets or thrusters.

Figure 3:
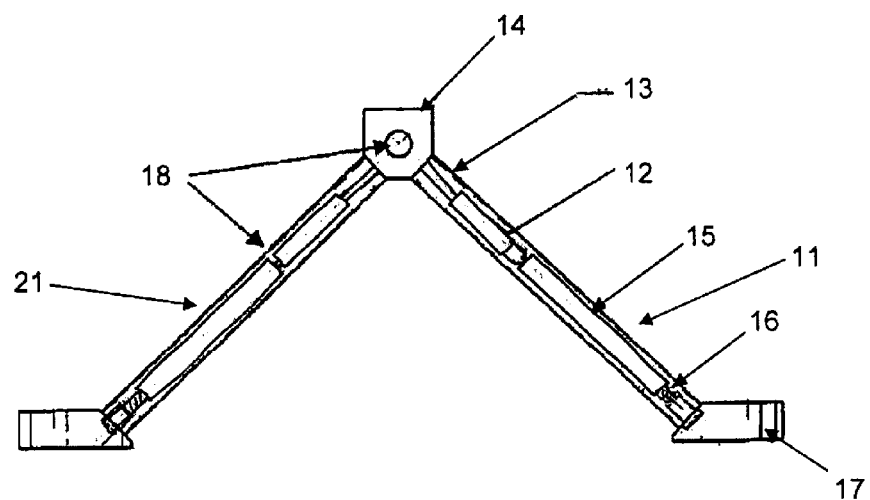
FIG. 3 is a detailed side view of an arrangement of mechanical connector struts and one or more electrical switches for a landing foot arrangement according to a second embodiment of the invention.

FIG. 3 shows a second embodiment of special features of a landing gear arrangement according to the invention, in which the substantially rigid mechanical connection between the foot pad 2 and the landing leg 1 comprises a plurality of struts in the form of tubes or pipes 11 and 21, of which an upper end is connected via an upper mounting bracket 14 to the landing leg 1, and of which a lower end is connected via a lower mounting bracket 17 that connects to the landing foot pad 2 (not shown in FIG. 3). This arrangement also includes predetermined rated breaking points 18, for example being a weakened location in the tubular strut 11 or 21, or a weakened link or area at the connection to the mounting bracket 14 or in the mounting bracket 14 itself, or in the connection to the mounting bracket 17 or in the mounting bracket 17 itself. This embodiment further includes an electrical switch 12 as a sensor element and signal emitter, which is arranged in the hollow interior of respectively at least one of the tubular struts 11, 21. Each switch 12 is respectively connected by a conductor to the evaluating unit 24 as described above. The switch 12 is mechanically connected to or braced against the upper mounting bracket 14 or the upper end of the tubular strut 11, 21 via an upper pipe section 13, and is connected to or braced against the lower mounting bracket 17 via a spacer piece 15 and an adjustment screw 16. Thereby, the triggering point of the switch 12 can be adjusted by the adjustment screw 16.

The embodiment of the mechanical connection as shown in FIG. 3 serves purposes and operates similarly to the mechanical connection shown in FIG. 2, as further described with reference to FIGS. 4A, 4B and 4C. Namely, initially as shown in FIG. 4A, the mechanical connection of FIG. 3 holds the footpad 2 in a perpendicular orientation relative to the landing leg 1. When the foot pad 2 makes contact with the landing ground surface 22, the landing contact force 23 exerts a bending moment on the mechanical connection, and thereby breaks at least one of the rated breaking points 18 of at least one of the tubular struts 11, 21 or its connection at one or both mounting brackets 14 and 17. This releases the substantially rigid mechanical connection between the foot pad 2 and the landing leg 1, and thereby allows the foot pad 2 to pivot or tilt about the pivotal connection (e.g. spherical bearing 3) as shown in the transition from FIG. 4B to FIG. 4C. Also, the mechanical breaking or disruption of the tubular strut 11, 21 or the connection between the tubular strut 11, 21 and the landing leg 1 via the mounting bracket 14 causes a mechanical activation of the electrical switch 12, which in turn opens or closes an electrical conduction circuit path so as to generate the corresponding signal that is provided to the evaluating unit 24. For example, the electrical switch 12 can comprise a spring-loaded plunger switch arranged in the tubular strut 11 and bearing against the upper mounting bracket 14 and the adjustment screw 16 via the spacer piece 15. The adjustment screw 16 thereby allows the triggering point of the plunger-activated switch 12 to be adjusted. When the predetermined rated breaking point 18 of the tubular strut 11 breaks, or the tubular strut 11 separates from the mounting bracket 14, then the spring-loaded plunger of the switch 12 extends outwardly, which thereby opens or closes an electrical circuit through the switch. Rather than a spring-loaded plunger switch, the electrical switch 12 may involve a switch element conductor pulling out from a contact so as to interrupt the electrical circuit when the strut breaks and thereby increases the distance between the two mounting brackets 14 and 17. Alternative configurations of the switch 12 are also possible. As a further alternative to electrical conductor wires and electrical switches as described above, the inventive arrangement can make use of optical conductor fibers and optical switches, with otherwise the same operation and function as described above for the electrical wires and switches. A further alternative electrical sensor element is a piezoelectric element.

As described above for the conductor wires 7, 8, a redundant arrangement of switches 12 is preferably provided in the embodiment of FIG. 3. Thus, at least two switches 12 are provided in at least two tubular struts 11, 21, and the evaluating unit 24 only triggers a shut-down of one or more retrorockets or thrusters upon receiving at least two contact signals from at least two such switches on one or more foot pads.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims. The abstract of the disclosure does not define or limit the claimed invention, but rather merely abstracts certain features disclosed in the application.

What is claimed is:

1. A landing gear system for a spacecraft that includes plural landing legs connected to and extending from a spacecraft body, and at least one retrorocket or retrothruster mounted on said spacecraft body;
   wherein said landing gear system comprises an evaluating unit that is connected for control signal transmission to said at least one retrorocket or retrothruster; and
   wherein said landing gear system further comprises respectively for each landing leg of said plural landing legs:
   a landing foot pad arranged at a distal end of said landing leg,
   a pivotal connection joint that pivotally connects said landing foot pad with said distal end of said landing leg,
   a substantially rigid truss arrangement of plural hollow struts that immovably connects said landing foot pad with said distal end of said landing leg, wherein at least two respective hollow struts of said plural hollow struts each respectively have a rated breaking point with a lower mechanical strength than a remaining portion of each one of said at least two respective hollow struts, and
   at least two electrical sensor elements selected from the group consisting of electrical switches and breakable electrical conductor wires, wherein said sensor elements are respectively arranged in said at least two respective hollow struts that each have said rated breaking point, wherein said sensor elements are connected by at least one electrical conduction path to said evaluating unit, and wherein said sensor elements are respectively adapted to open or close said at least one electrical conduction path in reaction to a mechanical disruption of said rated breaking points of said at least two respective hollow struts in which said sensor elements are arranged.

2. The landing gear system according to claim 1, wherein each one of said sensor elements respectively comprises one of said breakable electrical conductor wires.

3. The landing gear system according to claim 1, wherein each one of said sensor elements respectively consists of one of said breakable electrical conductor wires.

4. The landing gear system according to claim 1, wherein each one of said sensor elements respectively comprises one of said electrical switches.

5. The landing gear system according to claim 1, wherein each one of said sensor elements respectively consists of one of said electrical switches.

6. The landing gear system according to claim 1, wherein said evaluating unit is adapted to transmit to said at least one retrorocket or retrothruster a shut-down signal effective to shut-down said at least one retrorocket or retrothruster responsive to a sensor signal produced by at least one of said sensor elements sensing said mechanical disruption.

7. The landing gear system according to claim 1, wherein said truss arrangement is substantially rigid so as to render said landing foot pad immovable relative to said landing leg until said at least one rated breaking point is disrupted, and after said at least one rated breaking point is disrupted said truss arrangement releases said landing foot pad to be movable relative to said landing leg via said pivotal connection joint.

* * * * *